(12) United States Patent
Kang et al.

(10) Patent No.: US 11,818,745 B2
(45) Date of Patent: Nov. 14, 2023

(54) METHOD AND APPARATUS FOR ASSIGNING RESOURCES IN WIRELESS COMMUNICATION SYSTEM

(71) Applicant: Samsung Electronics Co., Ltd., Suwon-si (KR)

(72) Inventors: Jaewon Kang, Suwon-si (KR); Hojoong Kwon, Suwon-si (KR); Soomin Ko, Suwon-si (KR); Byunggook Kim, Suwon-si (KR); Myungkwang Byun, Suwon-si (KR); Jaehee Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 6 days.

(21) Appl. No.: 17/043,637

(22) PCT Filed: Apr. 12, 2019

(86) PCT No.: PCT/KR2019/004447
§ 371 (c)(1),
(2) Date: Sep. 29, 2020

(87) PCT Pub. No.: WO2019/199122
PCT Pub. Date: Oct. 17, 2019

(65) Prior Publication Data
US 2021/0022151 A1    Jan. 21, 2021

(30) Foreign Application Priority Data
Apr. 12, 2018 (KR) .................. 10-2018-0042908

(51) Int. Cl.
*H04W 72/543* (2023.01)
*H04W 4/70* (2018.01)
*H04W 72/23* (2023.01)

(52) U.S. Cl.
CPC ............ *H04W 72/543* (2023.01); *H04W 4/70* (2018.02); *H04W 72/23* (2023.01)

(58) Field of Classification Search
CPC ........ H04L 5/006; H04L 5/0092; H04W 4/70; H04W 72/042; H04W 72/087;
(Continued)

(56) References Cited

U.S. PATENT DOCUMENTS

| | | | |
|---|---|---|---|
| 8,730,900 B2* | 5/2014 | Li | H04W 28/20 |
| | | | 370/329 |
| 10,097,282 B1* | 10/2018 | Chao | H04B 17/27 |

(Continued)

FOREIGN PATENT DOCUMENTS

| | | |
|---|---|---|
| EP | 2533476 A1 | 12/2012 |
| EP | 2798756 A1 | 11/2014 |

(Continued)

OTHER PUBLICATIONS

European Patent Office, "Supplementary European Search Report," dated Apr. 15, 2021, in connection with European Patent Application No. 19784667.8, 8 pages.

(Continued)

*Primary Examiner* — Otis L Thompson, Jr.

(57) ABSTRACT

The present disclosure relates to a communication technique for converging a 5G communication system for supporting a higher data transfer rate beyond a 4G system with IoT technology, and a system therefor. The present disclosure may be applied to intelligent services (for example, smart homes, smart buildings, smart cities, smart cars or connected cars, health care, digital education, retail business, security and safety-related services, etc.) on the basis of 5G communication technology and IoT-related technology. The present disclosure relates to a method for assigning transmission resources including an uplink (UL)-dedicated (Continued)

region and a downlink (DL)-dedicated region, the method comprising: a step for identifying a ratio of the DL-dedicated region to the UL-dedicated region; a step for changing the ratio of the DL-dedicated region to the UL-dedicated region by using at least one of a utilization rate and electric field characteristic information of the transmission resources; and a step for assigning the UL-dedicated region and the DL-dedicated region according to the changed ratio of the DL-dedicated region to the UL-dedicated region.

18 Claims, 12 Drawing Sheets

(58) Field of Classification Search
CPC . H04W 72/1205; H04W 24/00; H04W 28/20; H04W 72/04; H04W 88/08
See application file for complete search history.

(56) References Cited

U.S. PATENT DOCUMENTS

| | | | |
|---|---|---|---|
| 11,191,094 B2* | 11/2021 | Lee | H04L 5/0053 |
| 2002/0123314 A1* | 9/2002 | Kitazawa | H04L 47/824 |
| | | | 455/134 |
| 2008/0192660 A1 | 8/2008 | Li et al. | |
| 2009/0204867 A1 | 8/2009 | Ho | |
| 2009/0219841 A1 | 9/2009 | Sudarshan et al. | |
| 2011/0211503 A1* | 9/2011 | Che | H04W 72/042 |
| | | | 370/280 |
| 2013/0102355 A1 | 4/2013 | Fujishiro | |
| 2014/0064233 A1* | 3/2014 | Oizumi | H04L 1/1861 |
| | | | 370/329 |
| 2015/0029910 A1* | 1/2015 | He | H04L 69/16 |
| | | | 370/280 |
| 2015/0055522 A1* | 2/2015 | Fu | H04L 5/14 |
| | | | 370/280 |
| 2015/0207595 A1* | 7/2015 | Oizumi | H04W 72/0446 |
| | | | 370/329 |
| 2015/0289261 A1* | 10/2015 | Oizumi | H04W 72/02 |
| | | | 370/329 |
| 2017/0208601 A1 | 7/2017 | Zhang et al. | |
| 2017/0273100 A1* | 9/2017 | Huang | H04W 72/1263 |
| 2018/0063858 A1* | 3/2018 | Au | H04L 5/0053 |
| 2018/0295220 A1* | 10/2018 | Ren | H04L 5/26 |
| 2023/0179335 A1* | 6/2023 | Bergström | H04L 1/1614 |
| | | | 370/280 |
| 2023/0199510 A1* | 6/2023 | Hathiramani | H04W 24/08 |
| | | | 370/329 |

FOREIGN PATENT DOCUMENTS

| | | |
|---|---|---|
| JP | 2013243722 A | 12/2013 |
| KR | 10-2015-0087795 A | 7/2015 |
| WO | 2013036545 A1 | 3/2013 |
| WO | 2013/100581 A1 | 7/2013 |
| WO | 2016/193793 A1 | 12/2016 |

OTHER PUBLICATIONS

Ericsson, "Flexible PDSCH/PUSCH starting PRB for MTC", 3GPP TSG-RAN WG1 Meeting #92bis, R1-1804125, 16 pages.
International Search Report dated Jul. 19, 2019 in connection with International Patent Application No. PCT/KR2019/004447, 4 pages.
Written Opinion of the International Searching Authority dated Jul. 19, 2019 in connection with International Patent Application No. PCT/KR2019/004447, 5 pages.
Communication pursuant to Article 94(3) EPC dated Nov. 21, 2022 in connection with European Patent Application No. 19 784 667.8, 7 pages.
Notice of Reasons for Refusal dated Feb. 13, 2023, in connection with counterpart Japanese Patent Application No. 2020555495, 8 pages.

* cited by examiner

| | GROUP | PREFERRED RESOURCE RATIO (DL : UL) | NUMBER OF UES |
|---|---|---|---|
| 810 | SINR > FIRST QUALITY THRESHOLD (HIGH SINR) | $m_1 : n_1$ | $l_1$ |
| 820 | SECOND QUALITY THRESHOLD < SINR ≤ FIRST QUALITY THRESHOLD | $m_2 : n_2$ | $l_2$ |
| 830 | SINR ≤ SECOND QUALITY THRESHOLD (LOW SINR) | $m_3 : n_3$ | $l_3$ |

FIG.8A

| | WEIGHTED PREFERRED RESOURCE RATIO (X) $= ((n_1/m_1)l_1 + ((n_2/m_2)l_2 + ((n_3/m_3)l_3) / (l_1 + l_2 + l_3)$ | READJUSTED RATIO (DL : UL) |
|---|---|---|
| 840 | X < FIRST PREFERENCE THRESHOLD | $m_1 : n_1$ |
| 850 | FIRST PREFERENCE THRESHOLD < X < SECOND PREFERENCE THRESHOLD | $m_2 : n_2$ |
| 860 | X ≥ SECOND PREFERENCE THRESHOLD | $m_3 : n_3$ |

FIG.8B

METHOD AND APPARATUS FOR ASSIGNING RESOURCES IN WIRELESS COMMUNICATION SYSTEM

CROSS-REFERENCE TO RELATED APPLICATIONS

This application is a 371 of International Application No. PCT/KR2019/004447 filed on Apr. 12, 2019, which claims priority to Korean Patent Application No. 10-2018-0042908 filed on Apr. 12, 2018, the disclosures of which are herein incorporated by reference in their entirety.

BACKGROUND

1. Field

The present disclosure relates to a wireless communication system, and more particularly, to a method and apparatus for allocating resources in a wireless communication system.

2. Description of Related Art

To satisfy increasing demands for wireless data traffic since commercialization of $4^{th}$ generation (4G) communication systems, efforts have been made to develop an enhanced $5^{th}$ generation (5G) communication system or a pre-5G communication system. For this reason, the 5G communication system or the pre-5G communication system is called a beyond 4G network communication system or a post long term evolution (LTE) system.

To achieve high data rates, deployment of the 5G communication system in an ultra-high (millimeter wave (mm-Wave)) frequency band (e.g., 60 GHz) is under consideration. Beamforming, massive multi-input multi-output (massive MIMO), full dimensional MIMO (FD-MIMO), array antennas, analog beamforming, and large-scale antennas have been discussed in the 5G communication system to mitigate the path loss of waves and increase the propagation distance of waves in the ultra-high frequency band.

Further, for network improvement of the system, techniques such as evolved small cell, advanced small cell, cloud radio access network (RAN), an ultra-dense network, device-to-device (D2D) communication, wireless backhaul, a moving network, cooperative communication, coordinated multi-point (CoMP), and reception interference cancellation are under development in the 5G communication system.

Besides, advanced coding modulation (ACM) such as hybrid FSK and QAM modulation (FQAM) and sliding window superposition coding (SWSC), and advanced access techniques such as filter back multi-carrier (FBMC), non-orthogonal multiple access (NOMA), and sparse code multiple access (SCMA) have been developed in the 5G system.

The Internet is evolving from a human-centered connection network in which people generate and consume information to the Internet of things (IoT) in which distributed elements such as things exchange and process information. The Internet of everything (IoE) is an example of big data processing and the IoT combined via a connection to a cloud server or the like.

To implement the IoT, technology elements such as sensing technology, wired and wireless communication, network infrastructure, service interfacing, and security are required. Recently, techniques such as sensor networks, machine-to-machine (M2M) communication, and machine type communication (MTC) are under study for connectivity between things.

In the IoT environment, an intelligent Internet technology (IT) service of creating new value for human living by collecting and analyzing data generated from connected things may be provided. The IoT may find its applications in the fields of smart homes, smart buildings, smart cities, smart cars or connected cars, smart grids, health care, smart appliances, and up-to-date medical services, through convergence with existing IT technologies.

In this regard, many attempts have been made to apply the 5G communication system to the IoT. For example, 5G technologies such as sensor networks, object communication, and MTC are being implemented by beamforming, MIMO, array antennas, and so on. Application of cloud wireless access networks by the afore-described big data processing technology may be an example of convergence between 5G technology and IoT technology.

MTC may provide communication services other than the general mobile Internet communication service, using the legacy LTE system. Particularly, enhanced MTC (eMTC) included in MTC technologies may provide a wireless communication means for providing IoT services.

Specifically, things including an eMTC user equipment (UE) applied to eMTC may access a wireless network at any time in any place by wireless communication with a base station (BS).

Accordingly, the BS should be able to relay both the legacy LTE communication (hereinafter, referred to as "broadband communication" or "LTE") and narrowband communication (hereinafter, referred to as "eMTC communication" or "eMTC").

The present disclosure provides a specific method of dynamically allocating resources for uplink (UL) communication and downlink (DL) communication in narrowband communication using some resource area of broadband communication by a base station (BS).

The present disclosure provides a method of allocating UL resources or DL resources according to at least one of the amount of used resources for UL or DL, electric field property information, or quality of service (QoS).

SUMMARY

According to the present disclosure, a method of allocating transmission resources including an uplink (UL)-dedicated region and a downlink (DL)-dedicated region by a base station includes identifying a ratio of the DL-dedicated region to the UL-dedicated region, changing the ratio of the DL-dedicated region to the UL-dedicated region based on at least one of a use rate of the transmission resources or electric field property information, and allocating the UL-dedicated region and the DL-dedicated region according to the changed ratio of the DL-dedicated region to the UL-dedicated region.

According to an embodiment, the use rate of the transmission resources may include a UL resource use rate being a ratio of the amount of required UL resources to the amount of UL available resources for allocation in the transmission resources, and a DL resource use rate being a ratio of the amount of required DL resources to the amount of DL available resources for allocation in the transmission resources.

According to an embodiment, the transmission resources may include first transmission resources and second transmission resources distinguished from each other on a frequency axis, the first transmission resources may support transmission of more delay-sensitive data than the second transmission resources, a maximum length of a first UL-dedicated region of the first transmission resources may be smaller than a maximum length of a second UL-dedicated region of the second transmission resources.

According to an embodiment, the first transmission resources may support transmission of guaranteed bit rate (GBR)-type data, and the second transmission resources may support transmission of non-GBR-type data.

According to an embodiment, the changing of the ratio of the DL-dedicated region to the UL-dedicated region may include, when the UL resource use rate is less than a first threshold, and the DL resource use rate is equal to or larger than the first threshold, increasing the ratio of the DL-dedicated region to the UL-dedicated region.

According to an embodiment, the changing of the ratio of the DL-dedicated region to the UL-dedicated region may include, when the UL resource use rate is equal to or larger than a first threshold, and the DL resource use rate is less than the first threshold, decreasing the ratio of the DL-dedicated region to the UL-dedicated region.

According to an embodiment, the changing of the ratio of the DL-dedicated region to the UL-dedicated region may include, when the UL resource use rate and the DL resource use rate are equal to or larger than a first threshold, and the DL resource use rate is equal to or larger than the sum of the UL resource use rate and an offset, increasing the ratio of the DL-dedicated region to the UL-dedicated region.

According to an embodiment, the changing of the ratio of the DL-dedicated region to the UL-dedicated region may include, when the UL resource use rate and the DL resource use rate are equal to or larger than a first threshold, and the UL resource use rate is equal to or larger than the sum of the DL resource use rate and an offset, decreasing the ratio of the DL-dedicated region to the UL-dedicated region.

According to an embodiment, the ratio of the DL-dedicated region to the UL-dedicated region may be changed based on the number of user equipments (UEs) and a preferred ratio of a DL-dedicated region to a UL-dedicated region, for each of UE groups classified according to electric field property information.

According to the present disclosure, a base station for allocating transmission resources including a UL-dedicated region and a DL-dedicated region includes a controller configured to identify a ratio of the DL-dedicated region to the UL-dedicated region, change the ratio of the DL-dedicated region to the UL-dedicated region based on at least one of a use rate of the transmission resources or electric field property information, and allocate the UL-dedicated region and the DL-dedicated region according to the changed ratio of the DL-dedicated region to the UL-dedicated region, and a transceiver configured to transmit UL data in the UL-dedicated region or DL data in the DL-dedicated region according to the changed ratio of the DL-dedicated region to the UL-dedicated region.

According to an embodiment, the use rate of the transmission resources may include a UL resource use rate being a ratio of the amount of required UL resources to the amount of UL available resources for allocation in the transmission resources, and a DL resource use rate being a ratio of the amount of required DL resources to the amount of DL available resources for allocation in the transmission resources.

According to an embodiment, the transmission resources may include first transmission resources and second transmission resources distinguished from each other on a frequency axis, the first transmission resources may support transmission of more delay-sensitive data than the second transmission resources, and a maximum length of a first UL-dedicated region of the first transmission resources may be smaller than a maximum length of a second UL-dedicated region of the second transmission resources.

According to an embodiment, the first transmission resources may support transmission of GBR-type data, and the second transmission resources may support transmission of non-GBR-type data.

According to an embodiment, when the UL resource use rate is less than a first threshold, and the DL resource use rate is equal to or larger than the first threshold, the controller may be configured to increase the ratio of the DL-dedicated region to the UL-dedicated region.

According to an embodiment, when the UL resource use rate is equal to or larger than a first threshold, and the DL resource use rate is less than the first threshold, the controller may be configured to decrease the ratio of the DL-dedicated region to the UL-dedicated region.

According to an embodiment, when the UL resource use rate and the DL resource use rate are equal to or larger than a first threshold, and the DL resource use rate is equal to or larger than the sum of the UL resource use rate and an offset, the controller may be configured to increase the ratio of the DL-dedicated region to the UL-dedicated region.

According to an embodiment, when the UL resource use rate and the DL resource use rate are equal to or larger than a first threshold, and the UL resource use rate is equal to or larger than the sum of the DL resource use rate and an offset, the controller may be configured to decrease the ratio of the DL-dedicated region to the UL-dedicated region.

According to an embodiment, the controller may be configured to change the ratio of the DL-dedicated region to the UL-dedicated region based on the number of UEs and a preferred ratio of a DL-dedicated region to a UL-dedicated region, for each of UE groups classified according to electric field property information.

The present disclosure may efficiently use resources by dynamically allocating physical channel resources required for uplink (UL) communication and downlink (DL) communication.

The present disclosure may solve the problems of resource waste and delayed data transmission, which are encountered with static resource allocation, by allocating a resource area based on the amount of used UL or DL resources.

The present disclosure may reduce overhead caused by unnecessary transition from UL resource allocation to DL resource allocation by determining a resource allocation area based on the amount of used UL or DL resources.

The present disclosure may provide fairness between UL resource allocation and DL resource allocation and fairness between UEs in a multi-UE access environment by allocating UL resources or DL resources according to the distribution of UEs which area classified based on electric field property information.

The present disclosure may satisfy the quality of each wireless communication service classified by quality of service (QoS) by separately defining resource areas according to the QoSs of UEs and allocating resources accordingly.

BRIEF DESCRIPTION OF THE DRAWINGS

FIGS. 8a and 8b are diagrams illustrating a method of determining the ratio of an available DL area for allocation to an available UL area for allocation based on electric field property information according to an embodiment.

DETAILED DESCRIPTION

Embodiments of the disclosure will be described below in detail with reference to the attached drawings. A detailed description of a generally known function or structure of the disclosure will be avoided lest it should obscure the subject matter of the disclosure. Although the terms used in the present disclosure are defined in consideration of functions in the embodiments of the disclosure, the terms may be changed according to the intention of a user or an operator, or customs. Therefore, the definitions should be made, not simply by the actual terms used but by the meanings of each term lying within.

Technological development is under way to satisfy significant performance metrics of enhanced mobile broadband (eMBB), ultra-reliable low-latency communication (URLLC), massive machine type communication (mMTC), and enhanced machine type communication (eMTC) as main use scenarios of $5^{th}$ generation new radio (5G NR).

With regard to the eMTC technology, research is being conducted to support low-cost devices deployed at high density, and expanded based on previously confirmed MTC discussions.

Specifically, the eMTC technology is intended to enhance the characteristics of machine-to-machine (M2M) communication or device-to-device (D2D) communication than the MTC technology. eMTC UEs including cheaper hardware, with a limited a use bandwidth (for example, 6 resource blocks (RBs)), are being produced. Further, repeated transmissions may be performed to increase the coverage of the eMTC UEs with the limited use bandwidth.

Figure 1:
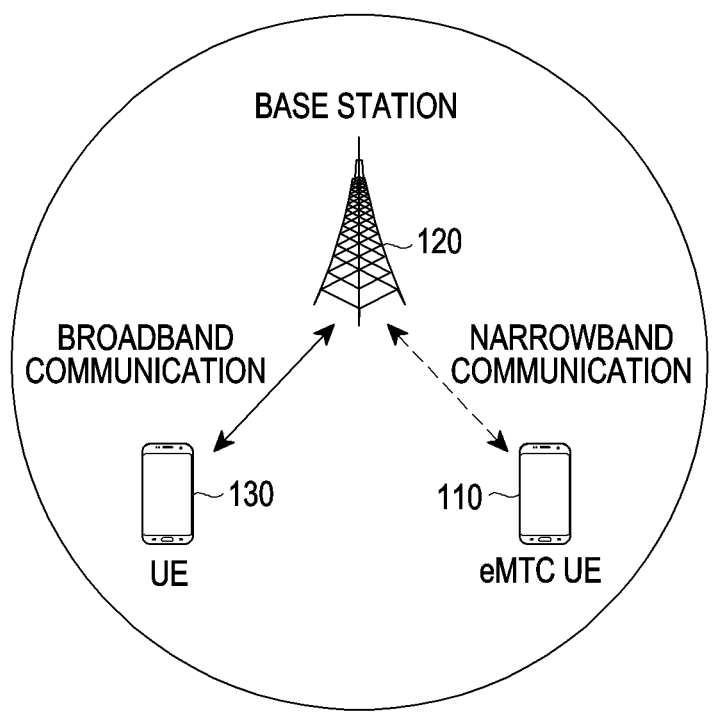
FIG. 1 is a diagram illustrating narrowband communication according to an embodiment.

FIG. 1 is a diagram illustrating narrowband communication according to an embodiment.

Referring to FIG. 1, a base station 120 is an entity wirelessly communicating with a user equipment 130 and an eMTC user equipment 110. A base station may also be referred to as a BS, Node B (NB), eNode B (eNB), or access point (AP).

The user equipment (hereinafter, referred to as "long term evolution (LTE) user equipment") 130 is an entity conducting LTE communication with a BS. A user equipment may also be referred to as a UE, mobile station (MS), mobile equipment (ME), device, or terminal.

The eMTC UE 110 is an entity conducting narrowband communication with the BS 120. According to some embodiments, the eMTC UE 110 may also be referred to as a low-cost device, a low-complexity device, or a bandwidth limited-coverage extension (BL-CE) UE reflecting enhanced features of M2M communication.

According to some embodiments, the eMTC UE 110 may encompass an eMTC UE and a narrowband Internet of things (NB-IoT) UE of the $3^{rd}$ generation partnership project (3GPP). According to some embodiments, the frequency resources of one RB may be allocated to an NB-IoT UE. For the convenience of description, the following description is given in the context of the eMTC UE 110, by way of example. However, it is apparent that application of an embodiment to UEs other than the eMTC UE 110 is not excluded and the embodiment is also applicable to UEs conducting wireless communication or other UEs supporting narrowband communication.

The eMTC UE 110 is usually assumed to be a low-cost device and may be designed with low complexity. For cost saving, the supported radio frequency band of the eMTC UE 110 may be limited to a partial area of the LTE communication. Because a band supported for eMTC communication is narrow relative to the frequency band of the LTE communication, the band may be referred to as a narrowband (NB).

Narrowband communication may be defined by a band of 1.4 MHz, a part of the legacy system band, and the eMTC UE 110 may be provided with a radio frequency (RF) transceiver to receive a signal in the band of 1.4 MHz. That is, the eMTC UE 110 may use a transceiver capable of receiving the band of 1.4 MHz, not the total system band. According to some embodiments, the eMTC UE 110 may receive signals, moving from one narrowband to another narrowband.

In this relation, there is a need for a method of coverage enhancement (CE) for the eMTC UE 110 having a narrow available band for transmission and reception, relative to the UE 130 supporting the legacy LTE communication.

In eMTC, a control channel for transmitting control information (e.g., physical downlink control channel (PDCCH)) and a data channel for transmitting data information (e.g., physical downlink shared channel (PDSCH)) may be defined separately. The BS may transmit a control channel (e.g., MTC PDCCH (MPDCCH)) and a data channel (e.g., PDSCH) separately.

MPDCCH is short for PDCCH for an MTC UE. The MPDCCH may be transmitted in a PDSCH resource area, like an enhanced PDCCH (ePDCCH) defined in the legacy LTE communication standards. The PDSCH resource area may refer to a wireless resource area except for a PDCCH area in a subframe. That is, eMTC communication may use a control signal on the new control channel, MPDCCH.

When the BS supports DL communication for the eMTC UE, the BS may transmit the MPDCCH carrying a control signal and the PDSCH carrying a data signal in different frames. In other words, when the BS allocates DL resources, the BS does not transmit the MPDCCH and the PDSCH in the same subframe. The MPDCCH may be transmitted in PDSCH resources of LTE communication, and the PDSCH may be transmitted after one transmission time interval (TTI) according to an embodiment. That is, in eMTC communication, the PDSCH may be transmitted in a different subframe from the subframe carrying the MPDCCH. One TTI may include one or more consecutive subframes. According to some embodiments, a TTI may be defined as a basic resource allocation unit of a BS or a minimum data transmission unit in the time domain. According to some embodiments, a TTI may be defined as a transmission time required for transmitting a specific number of RBs. An RB may be a minimum resource allocation unit for data transmission. The BS may allocate transmission data to RBs according to the priority of the transmission data in each TTI.

The BS may support the eMTC device by cross-subframe scheduling in which a data signal is transmitted a predetermined time after transmission of a control signal.

In a wireless communication system according to the present disclosure, transmission resources may include at least one DL available area for allocation and at least one UL available area for allocation. The BS may transmit DL traffic in the DL available area for allocation to the UE, and the UE may transmit UL traffic in the UL available area for allocation to the BS. Although the BS is capable of both UL reception and DL transmission, the BS may perform only one of UL reception and DL transmission at a specific time. For example, the DL available area for allocation and the UL available area for allocation may alternate over time in the transmission resources.

In the present disclosure, the transmission resources may include all types of resources used for transmission. For example, the transmission resources may be configured as a combination including at least one of frequency resources, time resources, or code resources.

In the present disclosure, a DL available area for allocation may be referred to as a "DL-dedicated region" or "DL-specific area", which is an area dedicated for DL transmission in the transmission resources. The DL available area for allocation may be allocated only for DL data transmission regardless of whether DL data is actually transmitted. For example, the DL-dedicated region may be at least one area distinguished on the time axis in the total transmission resources.

In the present disclosure, a UL available area for allocation may be referred to as a "UL-dedicated region" or "UL-specific area", which is an area dedicated for UL transmission in the transmission resources. The UL available area for allocation may be allocated only for UL data transmission regardless of whether UL data is actually transmitted. For example, the UL-dedicated region may be at least one area distinguished on the time axis in the total transmission resources.

Figure 2A:
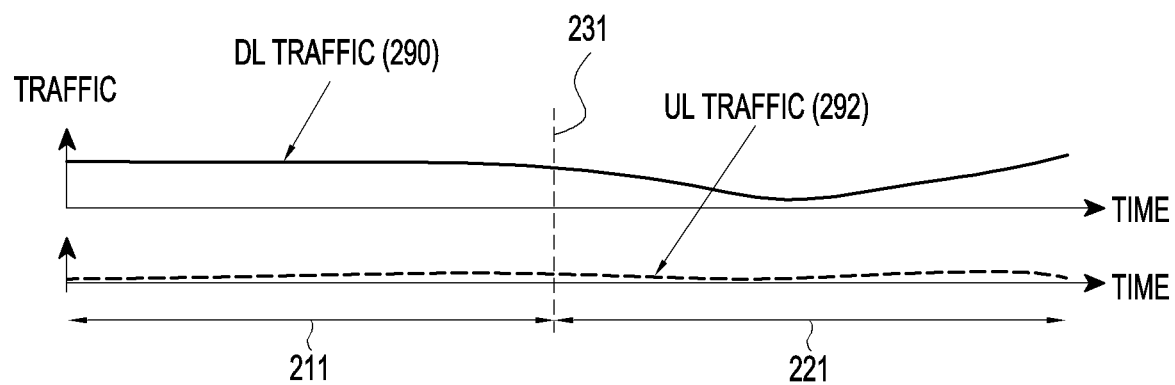
FIGS. 2a and 2b are diagrams illustrating uplink (UL) resource areas and downlink (DL) resource areas which are configured statically according to an embodiment.
Figure 2B:
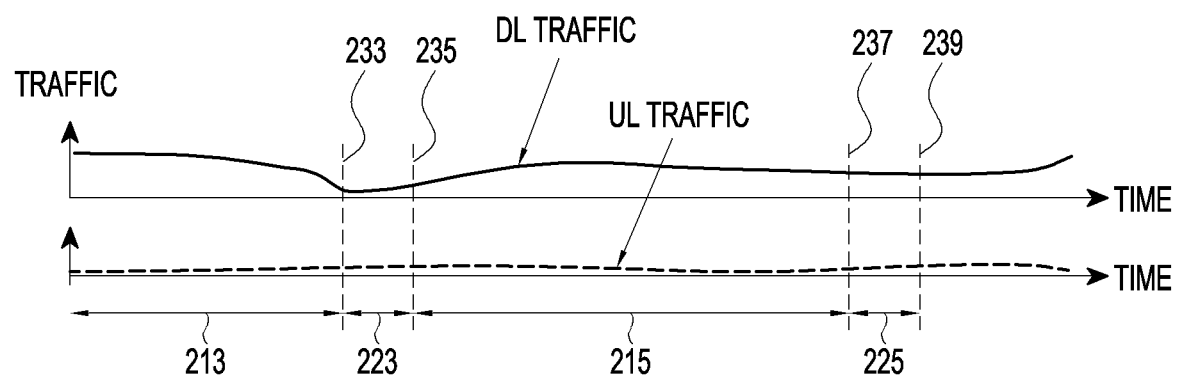

FIGS. 2a and 2b are diagrams illustrating a UL resource area and a DL resource area which are statically distinguished from each other according to an embodiment.

DL data for an eMTC UE may be transmitted on a PDSCH. Before the DL data transmission, a BS may transmit a DL grant including PDSCH resource allocation information (that is, information indicating RBs carrying the PDSCH, the number of times the PDSCH is transmitted repeatedly, and a time at which the PDSCH is transmitted) on an MPDCCH. The MPDCCH may be referred to as a DL grant MPDCCH.

The BS may determine time points at which a PDSCH and a DL grant MPDCCH are to be transmitted to each eMTC UE and the number of times the PDSCH and the DL grant MPDCCH are to be transmitted. This determination of the BS may be referred to as DL scheduling, and an entity performing the DL scheduling at the BS may be referred to as a DL scheduler. DL data (for example, the DL grant MPDCCH and the PDSCH) allocated as a result of scheduling at the DL scheduler may be transmitted, for example, in DL-dedicated regions 211, 213, and 215.

Similarly, UL data of the eMTC UE may be transmitted on a PUSCH. Before the UL data transmission, the BS may transmit a UL grant including PUSCH resource allocation information (that is, information indicating RBs carrying the PUSCH, the number of times the PUSCH is transmitted repeatedly, and a time at which the PUSCH is transmitted) on an MPDCCH. The MPDCCH may be referred to as a UL grant MPDCCH.

The BS may determine a time point at which a UL grant MPDCCH are to be transmitted to each eMTC UE and the number of times the UL grant MPDCCH is to be transmitted. This determination of the BS may be referred to as UL scheduling, and an entity performing the UL scheduling at the BS may be referred to as a UL scheduler. UL data (for example, the PUSCH) allocated as a result of scheduling at the UL scheduler may be transmitted, for example, in UL-dedicated regions 221, 223, and 225. However, the UL grant MPDCCH may be transmitted, for example, in the DL-dedicated regions 211, 213, and 215.

According to some embodiments, the BS may include at least one of the DL scheduler or the UL scheduler. The DL scheduler may schedule the PDSCH, and the UL scheduler may schedule the PUSCH. According to some embodiments, the periods of the DL-dedicated regions 211, 213, and 215 used exclusively by the DL scheduler may be referred to as DL turns, and the periods of the UL-dedicated regions 221, 223, and 225 used exclusively by the UL scheduler may be referred to as UL turns. Further, switching between a DL turn and a UL turn may be referred to as turn giving and taking between the scheduling entities. A time at which a DL turn switches to a UL turn or vice versa may be referred to as a switching time (e.g., 231).

In FIG. 2a, the BS may fixedly configure a transmission resource area for DL communication, that is, the DL-dedicated region 211 and a transmission resource area for UL communication, that is, the UL-dedicated region 221. That is, the BS may fix the switching time 231 at which the DL-dedicated region 211 is switched to the UL-dedicated region 221. When the switching time 231 is fixed, a transmission resource occupancy ratio between the UL-dedicated region 221 and the DL-dedicated region 211 is fixed.

FIG. 2a illustrates the amount of UL traffic 292 and the amount of DL traffic 290 at a switching time, when the BS uses the switching time as fixed. When the BS allocates the UL-dedicated region 221 and the DL-dedicated region 211 by fixing the switching time 231, it is difficult to reflect the amount of traffic between the BS and the eMTC UE in resource allocation. For example, it may be noted from FIG. 2a that a small amount of UL data is to be allocated but a relatively large amount of DL data remains, at the switching time 231. Even though there is no UL data or small UL data relative to DL data, the BS schedules the UL-dedicated region 221. In other words, in spite of the absence of UL data, the DL scheduler gives a scheduling opportunity to the UL scheduler. Once the scheduling opportunity is given to the UL scheduler, time scheduling for DL communication is limited even though there is DL data to be transmitted for the DL communication. Accordingly, no resources are allocated to the DL data requiring resources, thereby causing transmission resource waste.

Referring to FIG. 2b, the BS may determine the DL-dedicated regions 213 and 215 and the UL-dedicated regions 223 and 225 by checking a maximum available time for allocation and the presence or absence of data to be transmitted.

For example, the BS may identify the presence or absence of UL data in the UL-dedicated region 223, and determine a time 235 at which the absence of UL data is identified to be the starting time of the DL-dedicated region 215. In other words, when identifying the absence of any UL data, the UL scheduler of the BS may immediately hand over the scheduling opportunity to the DL scheduler.

When a maximum available time 237 for allocation to the DL-dedicated region 215 elapses, the BS may determine the time point 237 at which the maximum available time 237 for allocation expires to be the starting time of the UL-dedicated region 225. When the maximum available time for allocation elapses, the DL scheduler should return the scheduling turn to the UL scheduler despite the presence of remaining DL data to be transmitted. Even though there exists only DL transmission data without any UL data from the starting time 237 of the scheduling turn of the UL scheduler, the DL scheduler is not allowed to allocate resources, thereby resulting in resource waste.

In FIG. 2b, the DL scheduler of the BS hands over the scheduling opportunity to the UL scheduler, simply based on the presence or absence of current DL data or UL data and the maximum available time for allocation without considering the amount of subsequent DL data or UL data to be transmitted. Considering that there is no UL data at the time 237 at which the maximum available time for allocation elapses, transition from the DL turn to the UL turn may be determined to be unnecessary, and overhead may occur until the UL scheduler returns the scheduling opportunity to the DL scheduler. In other words, despite the presence of DL data without UL data, the DL scheduler additionally waits until before getting back the scheduling opportunity from the UL scheduler, to transmit the DL transmission data. Particularly, when delay-sensitive data (e.g., voice over LTE (VoLTE) data) co-exists with general data, a resource allocation time should be reduced to quickly get back the scheduling opportunity. That is, the DL-dedicated regions 211, 213, and 215, and the UL-dedicated regions 221, 223, and 225 should be reduced. However, the reduction of the available areas for allocation may make it difficult to perform repeated transmissions for the eMTC UE and hence reduce the coverage of the eMTC UE.

Therefore, the present disclosure proposes a method of determining a UL-dedicated region and a DL-dedicated region of transmission resources in consideration of at least one of the amount of transmission resources for a UE, electric field property information about the UE (e.g., a signal-to-interference and noise ratio (SINR) distribution and reception sensitivity information), or QoS. For example, transmission resources may be allocated for DL or UL in the time domain or the frequency domain.

Figure 3:
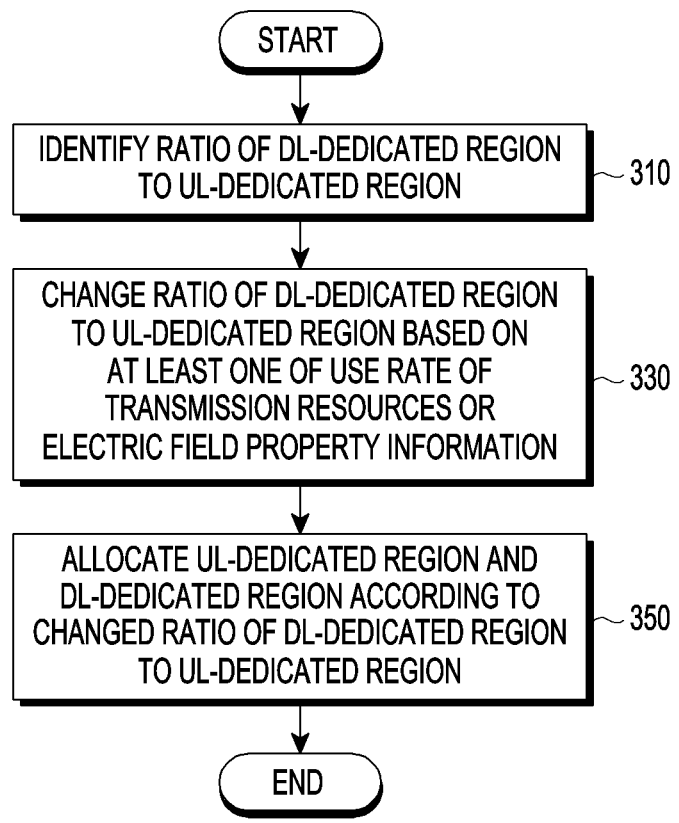
FIG. 3 is a flowchart illustrating a method of allocating resources by a base station (BS) according to an embodiment.

FIG. 3 is a flowchart illustrating a method of allocating resources by a BS according to an embodiment.

Referring to FIG. 3, the BS may identify the ratio of a DL-dedicated region to a UL-dedicated region (310).

The BS may identify the UL-dedicated region and the DL-dedicated region at the starting time of scheduling DL data or UL data and then identify the ratio of the DL-dedicated region to the UL-dedicated region.

The BS may change the ratio of the DL-dedicated region to the UL-dedicated region according to at least one of a transmission resource use rate or electric field property information (330).

The transmission resource use rate may include a UL resource use rate defined as the ratio of the amount of required UL resources to the amount of available UL resources in transmission resources, and a DL resource use rate defined as the ratio of the amount of required DL resources to the amount of available DL resources in the transmission resources. A method of obtaining a UL resource use rate and a DL resource use rate will be described in detail later with reference to FIG. 4.

The BS may allocate a DL-dedicated region and a UL-dedicated region according to the changed ratio of the DL-dedicated region to the UL-dedicated region in operation 330 (330).

The BS may then transmit UL data in the UL-dedicated region or DL data in the DL-dedicated region according to the changed ratio of the DL-dedicated region to the UL-dedicated region.

Figure 4:
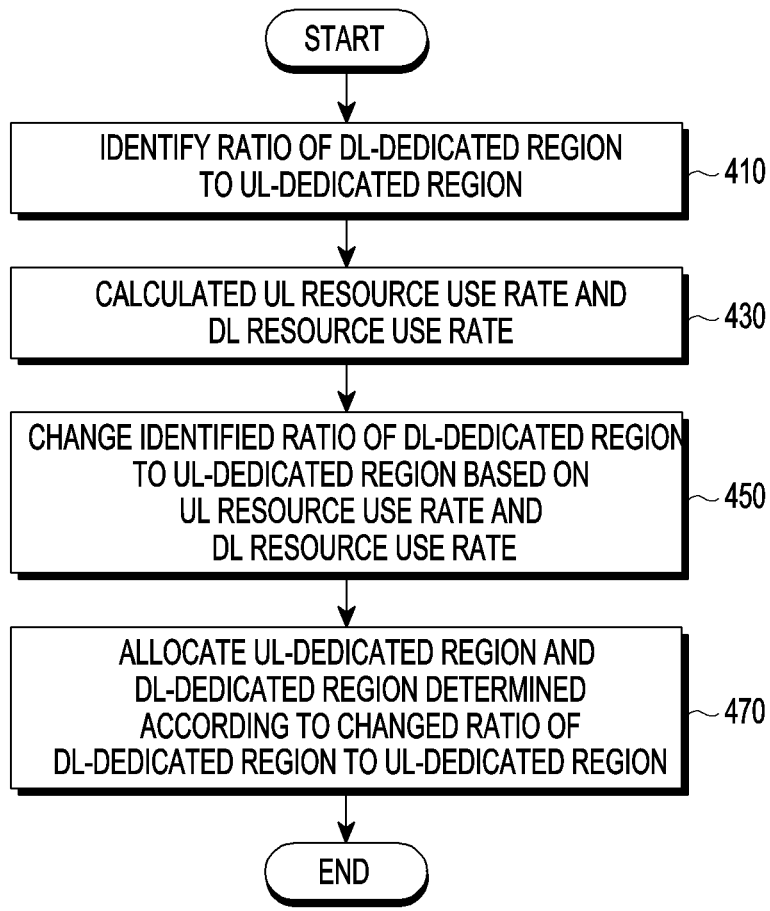
FIG. 4 is a flowchart illustrating a method of allocating resources based on a DL resource use rate and a UL resource use rate by a BS according to an embodiment.

FIG. 4 is a flowchart illustrating a method of allocating resources according to a UL resource use rate and a DL resource use rate by a BS according to an embodiment.

Referring to FIG. 4, the BS may identify the ratio of a DL-dedicated region to a UL-dedicated region (hereinafter, referred to as a "relative ratio") in a first TTI (410).

The BS may identify the UL-dedicated region and the DL-dedicated region at the starting time of scheduling DL data or UL data. For example, the DL-dedicated region may be determined based on a DL resource available time for allocation, and the UL-dedicated region may be determined based on a UL resource available time for allocation.

According to some embodiments, the maximum length of a dedicated region may be determined to be a DL data or UL data generation duration (e.g., 1 ms or 5 ms). Alternatively, the maximum length of a dedicated region may be determined to be a value calculated by multiplying a resource allocation unit time (e.g., 1 ms) by a maximum repetition number. The maximum repetition number may indicate the number of DL (or UL) repeated transmissions. As the maximum repetition number is larger, the maximum available time for allocation may be longer.

According to some embodiments, the maximum length of a dedicated region may be calculated differently according to the QoS of DL data or UL data. The maximum length of the dedicated region may be determined differently according to a resource type as one of parameters included in the QoS. For example, guaranteed bit rate (GBR) data is data for which a bandwidth may be guaranteed, and the maximum length of a dedicated region for the GBR data may be determined to be a data generation duration in order to guarantee the reception quality of traffic. For example, the maximum length of a dedicated region for an example of GBR data, VoLTE traffic may be set to be equal to the generation duration of a VoLTE packet.

After the BS identifies the UL-dedicated region and the DL-dedicated region, the BS may identify the ratio of the DL-dedicated region to the UL-dedicated region.

According to some embodiments, the BS may identify a resource available time for allocation for each of a DL resource available area for allocation and a UL resource available area for allocation according to the characteristics (e.g., resource type) of data at the starting time of scheduling DL data or UL data.

For example, when the DL resource available time for allocation is 10 ms and the UL resource available time for allocation is 20 ms, the BS may identify the relative ratio of the DL-dedicated region to the UL-dedicated region as ½.

The BS may obtain a UL resource use rate and a DL resource use rate which are used to determine whether the identified ratio is to be changed, before changing the identified ratio (430).

The UL resource use rate is the ratio of used resources to resources available for UL transmission, and the DL resource use rate is the ratio of used resources to resources available for DL transmission.

To obtain a UL resource use rate and a DL resource use rate, a first method using the amount of actually allocated resources and a second method considering the amount of required resources are available. The first method may consider how resources are allocated in a current TTI (or previous TTI). The second method may consider the amount of data to be allocated in a subsequent TTI, not a current TTI.

For example, when the UL resource use rate is larger than the DL resource use rate in the first method, the BS may allocate more resources for UL than for DL in the current TTI. Further, for example, when the DL resource use rate is larger than the UL resource use rate in the second method, the BS may allocate more resources for DL than for UL in the current TTI.

First, a method of obtaining a UL resource use rate and a DL resource use rate according to the first method will be described below.

According to some embodiments, a UL resource use rate in the first method may be defined as the ratio of the amount of allocated UL resources to the amount of available UL resources for allocation in a first TTI for which the current scheduling is performed. Similarly, a DL resource use rate in the first method may be defined as the ratio of the amount of allocated DL resources to the amount of available DL resources for allocation in the first TTI for which the current scheduling is performed. The UL resource use rate may be obtained based on the number of RBs allocated for actual UL communication. Specifically, the UL resource use rate may be the ratio of the number of RBs (i.e., the ratio of RBs) allocated for actual UL communication in the first TTI to the number of RBs available for UL resource allocation in the first TTI. Similarly, the DL resource use rate may be the ratio of the number of RBs (i.e., the ratio of RBs) allocated for actual DL communication in the first TTI to the number of RBs available for DL resource allocation in the first TTI.

A method of obtaining a UL resource use rate and a DL resource use rate in a first TTI will be described later with reference to FIG. 6. The maximum values of the UL resource use rate and the DL resource use rate in the first method are 1. When the number of already allocated RBs is equal to or close to the number of available RBs for allocation, there may be a limit on representing the load of DL data of the BS or UL data. Accordingly, the BS may consider buffer occupancies (BOs) as the amounts of DL data and UL data which are to be transmitted but not scheduled in the second method. Because the amount of required data may be larger than the amount of available resources for allocation, a DL resource use rate and a UL resource use rate of the second method obtained based on the BOs may be larger than 1.

According to some embodiments, when the UL resource use rate or the DL resource use rate determined as a ratio of RBs in the first TTI according to the first method is close to 1 (for example, the UL resource use rate or the DL resource use rate of the first method is 0.9), the BS may use a DL resource use rate and a UL resource use rate which are larger than 1 by using BOs according to the second method.

According to some embodiments, the UL resource use rate of the second method may be determined to be the ratio of the amount of required UL resources to the amount of UL available resources for allocation in a second TTI after the first TTI for which the current scheduling is performed. The DL resource use rate of the second method may be determined to be the ratio of the amount of required DL resources to the amount of DL available resources for allocation in the second TTI after the first TTI for which the current scheduling is performed. That is, the UL resource use rate and the DL resource use rate according to the second method may be calculated in consideration of resources to be allocated, not already-allocated resources.

To consider the resources to be allocated, the BS may consider the BO of its buffer according to some embodiments. For example, a BO may be calculated as the number of current packets queued for the UE in the BS. The BO may be represented in bits, bytes, or byte units. The BO may indicate the amount of data to be transmitted in the buffer.

The BS may use a spectral efficiency (SE) in addition to a BO in order to calculate an RB ratio according to the second method. The SE indicates the amount of transmittable data per unit RB. Therefore, the ratio of a BO in the second TTI to the SE of the second TTI may indicate the ratio of required RBs to available RBs for allocation in the second TTI.

Specifically, according to the second method of the present disclosure, the BS may identify the number of UL available RBs for allocation and the number of DL available RBs for allocation in the second TTI after the first TTI. The BS may obtain the UL resource use rate based on the second method, which is calculated as the ratio of the number of required UL RBs to the number of UL available RBs for allocation. Likewise, the BS may obtain the DL resource use rate based on the second method, which is calculated as the ratio of the number of required DL RBs to the number of DL available RBs for allocation. Herein, the DL resource use rate may be based on the amount of transmittable data per unit RB and a DL BO, and the UL resource use rate may be based on the amount of transmittable data per unit RB and a UL BO.

According to some embodiments, the resource use rate according to the second method may be calculated by Equation 1.

$$\text{Resource use rate} = \left( \sum_{i=0}^{N-1} \frac{BO(i)}{SE(i)} \bigg/ \text{total number of available } RBs \text{ for allocation} \right) \quad [\text{Equation 1}]$$

In Equation 1, BO(i) is a BO, indicating the amount of data to be transmitted for UE(i), and SE(i) is an SE, indicating the amount of transmittable data per unit RB for UE(i).

The BS may change the ratio (i.e., relative ratio) of a DL-dedicated region to a UL-dedicated region, identified in step 410 based on the UL resource use rate and the DL resource use rate obtained according to the first method or the second method (450).

The BS may compare the obtained UL resource use rate and DL resource use rate with a first threshold and a second threshold. A specific subsequent operation based on the result of the comparison will be described in detail with reference to FIGS. 5a to 5d.

The BS may allocate a UL-dedicated region and a DL-dedicated region determined according to the changed relative ratio (470).

The BS may receive UL data from the UE in the UL-dedicated region determined according to the changed ratio and transmit DL data to the UE in the DL-dedicated region determined according to the changed ratio.

As such, the BS may change the ratio of a DL-dedicated region to a UL-dedicated region based on an actual resource use rate or the ratio (i.e., relative ratio) of a DL-dedicated region to a UL-dedicated region based on required resource use rates. The BS may determine the sizes (or lengths) of a DL-dedicated region and a UL-dedicated region according to the changed relative ratio. The BS may adaptively cope with a varying amount of resources used for the UE by periodically (or aperiodically) changing the ratio of a DL-dedicated region to a UL-dedicated region. Accordingly, UL resources and DL resources may be used efficiently.

FIGS. 5a to 5d are flowcharts illustrating a method of determining the ratio of a DL-dedicated region to a UL-dedicated region according to an embodiment.

With reference to FIGS. 5a to 5d, operations included in operation 450 for changing the relative ratio identified in operation 410 of FIG. 4 will be described below.

The BS may compare the UL resource use rate with a first threshold and compare the DL resource use rate with the first threshold (510).

When the UL resource use rate is less than the first threshold and the DL resource use rate is also less than the first threshold ("Yes" in operation 510), it may not be necessary to change the ratio of the DL-dedicated region to the UL-dedicated region, identified in operation 410 (see FIG. 4) because both of the UL resource use rate and the DL resource use rate are low. Therefore, when both of the UL resource use rate and the DL resource use rate are less than the first threshold, the BS may maintain (may not change) the ratio of the DL-dedicated region to the UL-dedicated region, identified in operation 410 (515). According to some embodiments, because either of the UL resource use rate and the DL resource use rate is not high, the BS may selectively change the relative ratio identified in operation 410 in consideration of electric field information. A method of considering electric field information will be described in detail with reference to FIGS. 8a and 8b.

Figure 5A:
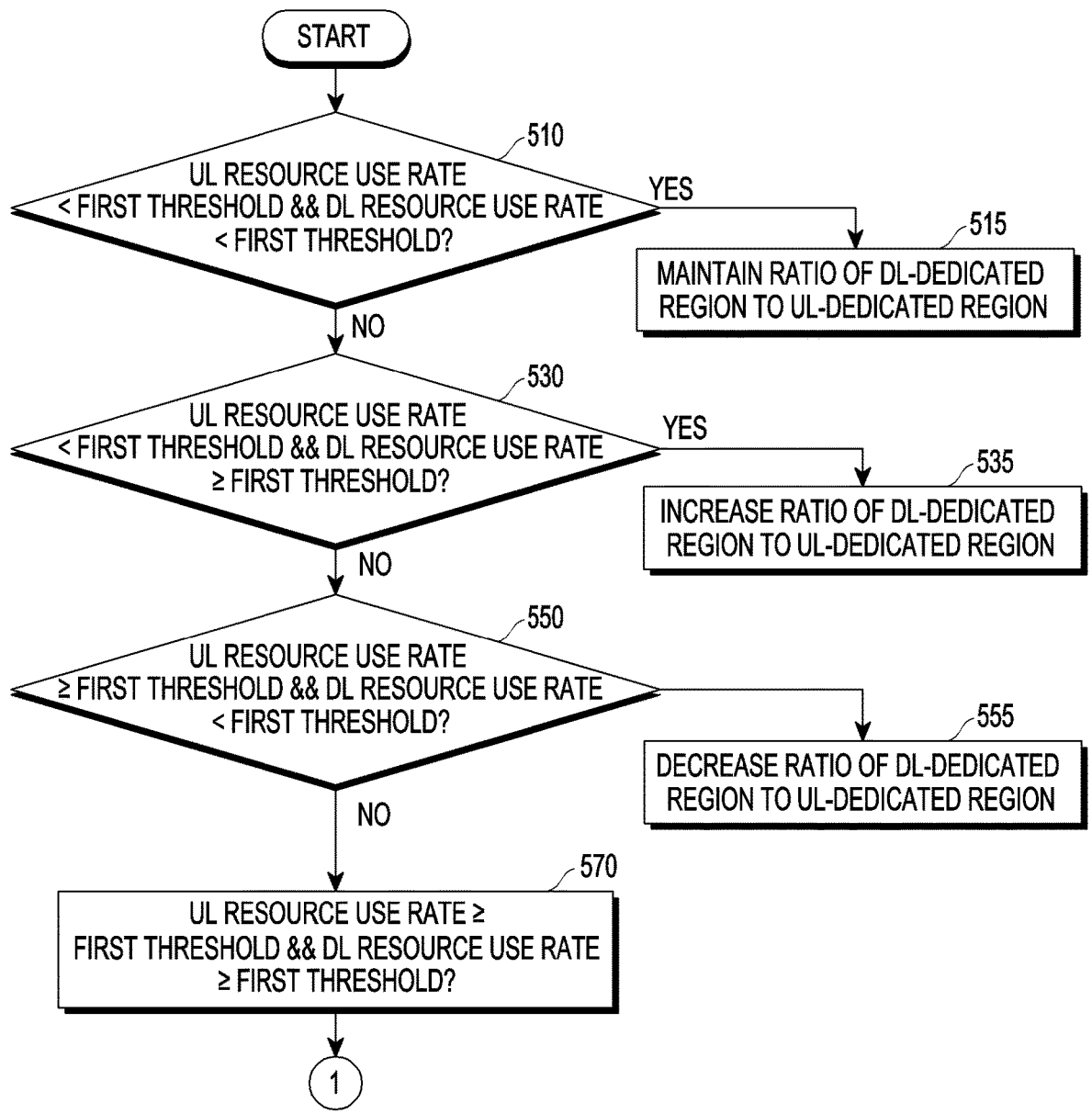
FIGS. 5a and 5b are flowcharts illustrating a method of determining the ratio of a DL-dedicated region to a UL-dedicated region according to an embodiment.
Figure 5B:
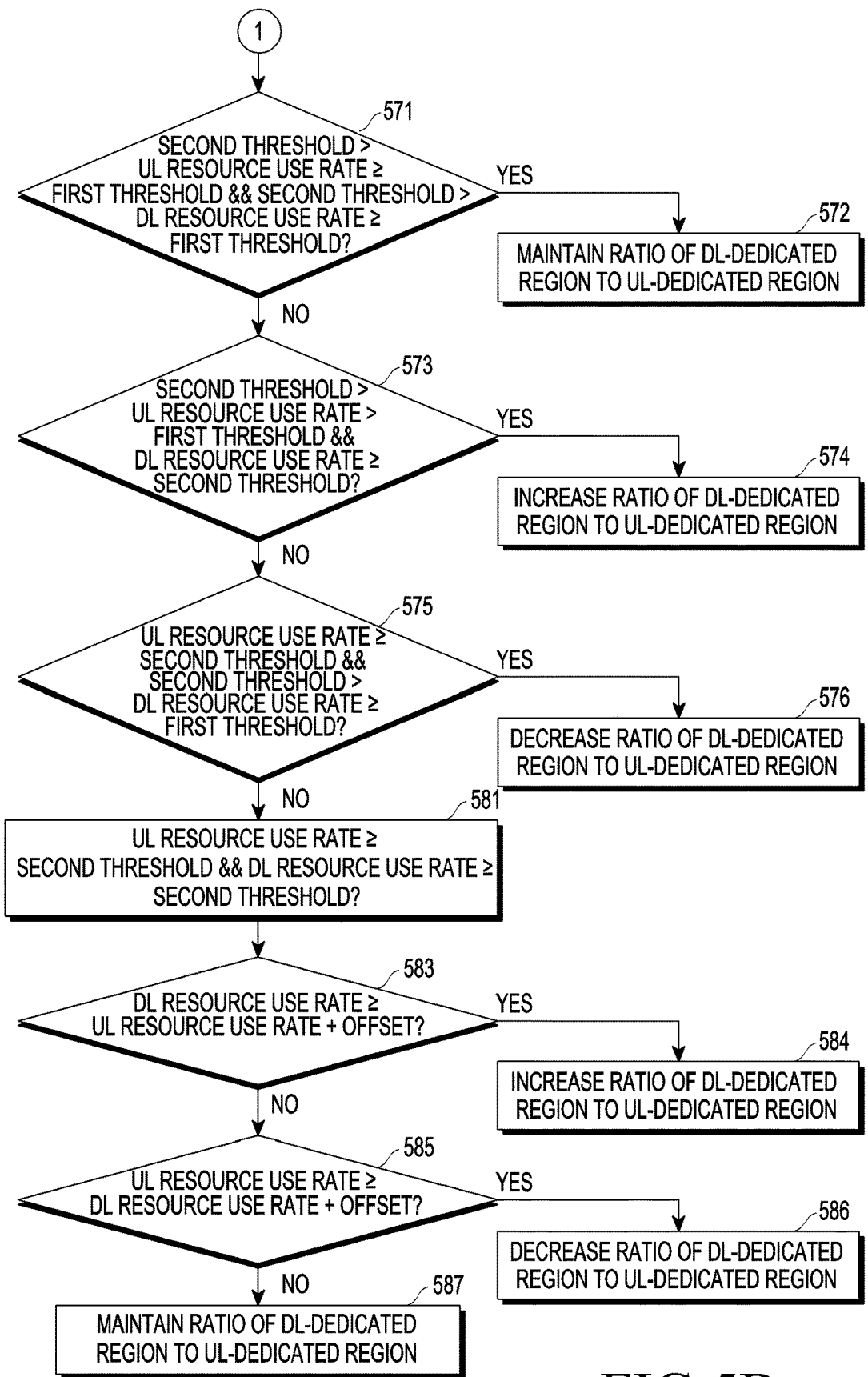

In three cases, the comparison result of operation 510 may be "No". Specifically, one of the three cases is that the UL resource use rate is less than the first threshold, and the DL resource use rate is equal to or larger than the first threshold (case 1). Another case is that the UL resource use rate is equal to or larger than the first threshold, and the DL resource use rate is less than the threshold (case 2). The other case is that both of the UL resource use rate and the DL resource use rate are equal to or larger than the first threshold (case 3). Case 1 and case 2 are illustrated in FIG. 5a, and case 3 is illustrated in FIG. 5b.

The BS may identify whether the UL resource use rate is less than the first threshold and the DL resource use rate is equal to or larger than the first threshold (530). When the UL resource use rate is less than the first threshold and the DL resource use rate is equal to or larger than the first threshold ("Yes" in operation 530), the BS may determine that many DL resources are used relative to UL resources. Therefore, the BS may increase the ratio of the DL-dedicated region to the UL-dedicated region identified in operation 410 by a predetermined ratio (535). Increasing the relative ratio identified in operation 410 by the predetermined value may mean increasing the amount of resources allocated for DL communication, compared to the amount of resources allocated for UL communication. A method of increasing a relative ratio by a predetermined ratio will be described in detail with reference to FIG. 7.

When the UL resource use rate is equal to or larger than the first threshold or the DL resource use rate is less than the first threshold as a result of the comparison ("No" in operation 530), the BS may identify whether the UL resource use rate is equal to or larger than the first threshold and the DL resource use rate is less than the first threshold (550).

When the UL resource use rate is equal to or larger than the first threshold and the DL resource use rate is less than the first threshold as a result of the comparison ("Yes" in operation 550), the BS may determine that many UL resources are used relative to DL resources. Therefore, the BS may decrease the ratio of the DL-dedicated region to the UL-dedicated region identified in operation 410 by a predetermined ratio (555). Decreasing the relative ratio identified in operation 410 by the predetermined value may mean increasing the amount of resources allocated for UL communication, compared to the amount of resources allocated for DL communication. A method of decreasing a relative ratio by a predetermined ratio will be described in detail with reference to FIG. 7.

The BS may identify whether the UL resource use rate is larger than the first threshold and the DL resource use rate is larger than the first threshold (570).

When the UL resource use rate is equal to or larger than the first threshold and the DL resource use rate is also equal to or larger than the first threshold (570), the BS may compare the UL and DL resource use rates with a second threshold (571). According to some embodiments, the second threshold may be larger than the first threshold.

When the UL resource use rate is equal to or larger than the first threshold and less than the second threshold and the DL resource use rate is also equal to or larger than the first threshold and less than the second threshold ("Yes" in operation 571), the BS may maintain the ratio identified in operation 410 (572). Because both of the UL resource use rate and the DL resource use rate are equal to or larger than the first threshold in operations 573 to 587 of FIG. 5b, operations 573 to 587 will be described, focusing on comparison with the second threshold.

The BS may identify whether the UL resource use rate is less than the second threshold and the DL resource use rate is equal to or larger than the second threshold (573).

When the UL resource use rate is less than the second threshold and the DL resource use rate is equal to or larger than the second threshold ("Yes" in 573), the BS may determine that many DL resources are used relative to UL resources. Therefore, the BS may increase the ratio of the DL-dedicated region to the UL-dedicated region identified in operation 410 by a predetermined ratio (574).

The BS may identify whether the UL resource use rate is equal to or larger than the second threshold and the DL resource use rate is less than the second threshold (575).

When the UL resource use rate is equal to or larger than the second threshold and the DL resource use rate is less than the second threshold ("Yes" in 575), the BS may determine that many UL resources are used relative to DL resources. Therefore, the BS may decrease the relative ratio identified in operation 410 by a predetermined ratio (576). When the UL resource use rate is equal to or larger than the second threshold and the DL resource use rate is also equal to or larger than the second threshold, the BS may use an offset to identify the difference between the DL resource use rate and the UL resource use rate (583). According to some embodiments, the offset may be a predetermined value.

When the DL resource use rate is equal to or larger than the sum of the UL resource use rate and the offset ("Yes" in operation 583), the BS may determine that the difference between the DL resource use rate and the UL resource use rate is large, and thus increase the relative ratio identified in operation 410 by a predetermined ratio (584). In contrast, when the DL resource use rate is less than the sum of the UL resource use rate and the offset, the BS may determine that the difference between the DL resource use rate and the UL resource use rate is not large, and thus maintain the relative ratio identified in operation 410. Optionally, the BS may change the relative ratio identified in operation 410 in consideration of electric field information.

When the UL resource use rate is equal to or larger than the sum of the DL resource use rate and the offset ("Yes" in operation 585), the BS may determine that the difference between the UL resource use rate and the DL resource use rate is large, and thus decrease the relative ratio identified in operation 410 by a predetermined ratio (586). In contrast, when the UL resource use rate is less than the sum of the DL resource use rate and the offset, the BS may determine that the difference between the DL resource use rate and the UL resource use rate is not large, and thus maintain the relative ratio identified in operation 410. Optionally, the BS may change the relative ratio identified in operation 410 in consideration of electric field information.

Figure 6:
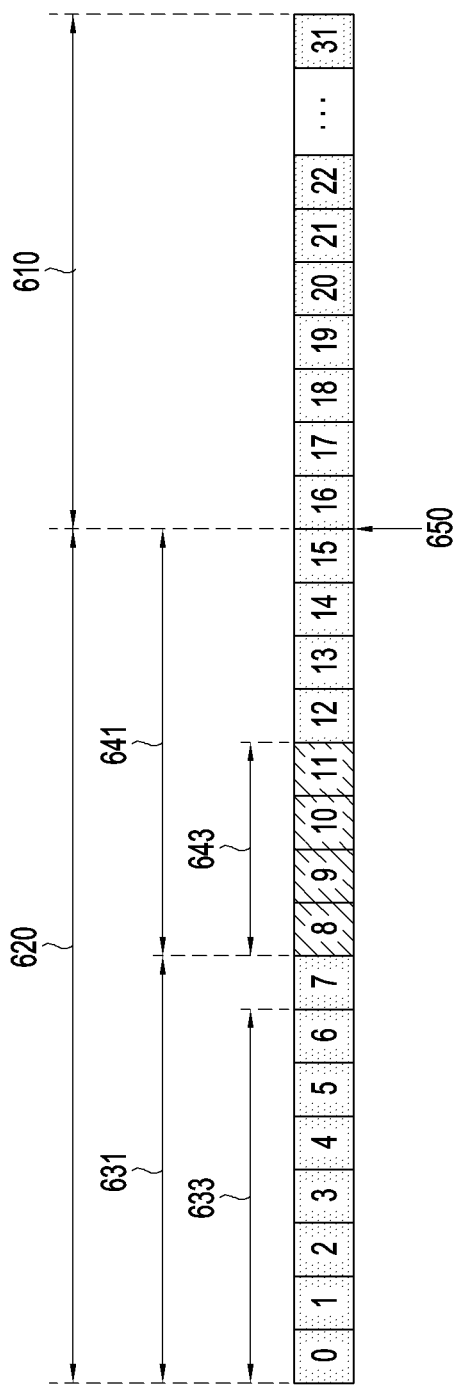
FIG. 6 is a diagram illustrating a method of calculating a UL resource use rate and a DL resource use rate in a first method according to an embodiment.

FIG. 6 is a diagram illustrating a method of calculating a UL resource use rate and a DL resource use rate according to the first method according to an embodiment.

Referring to FIG. 6, the BS may obtain a UL resource use rate and a DL resource use rate, which indicate the use rate of allocated resources.

For example, a DL resource use rate in a second TTI 620 before a first TTI 610 may be calculated as the ratio of an actually allocated DL resource area 633 to a total area 631 allowed (i.e., available) for DL resource allocation.

A UL resource use rate in the second TTI 620 may be calculated as the ratio of an actually allocated UL resource area 643 to a total area 641 allowed (i.e., available) for UL resource allocation.

The BS may calculate a UL resource use rate and a DL resource use rate in each TTI. For example, the BS may calculate a UL resource use rate and a DL resource use rate at a time at which the second TTI 620 starts or at a time 650 at which the first TTI 610 starts.

Figure 7:
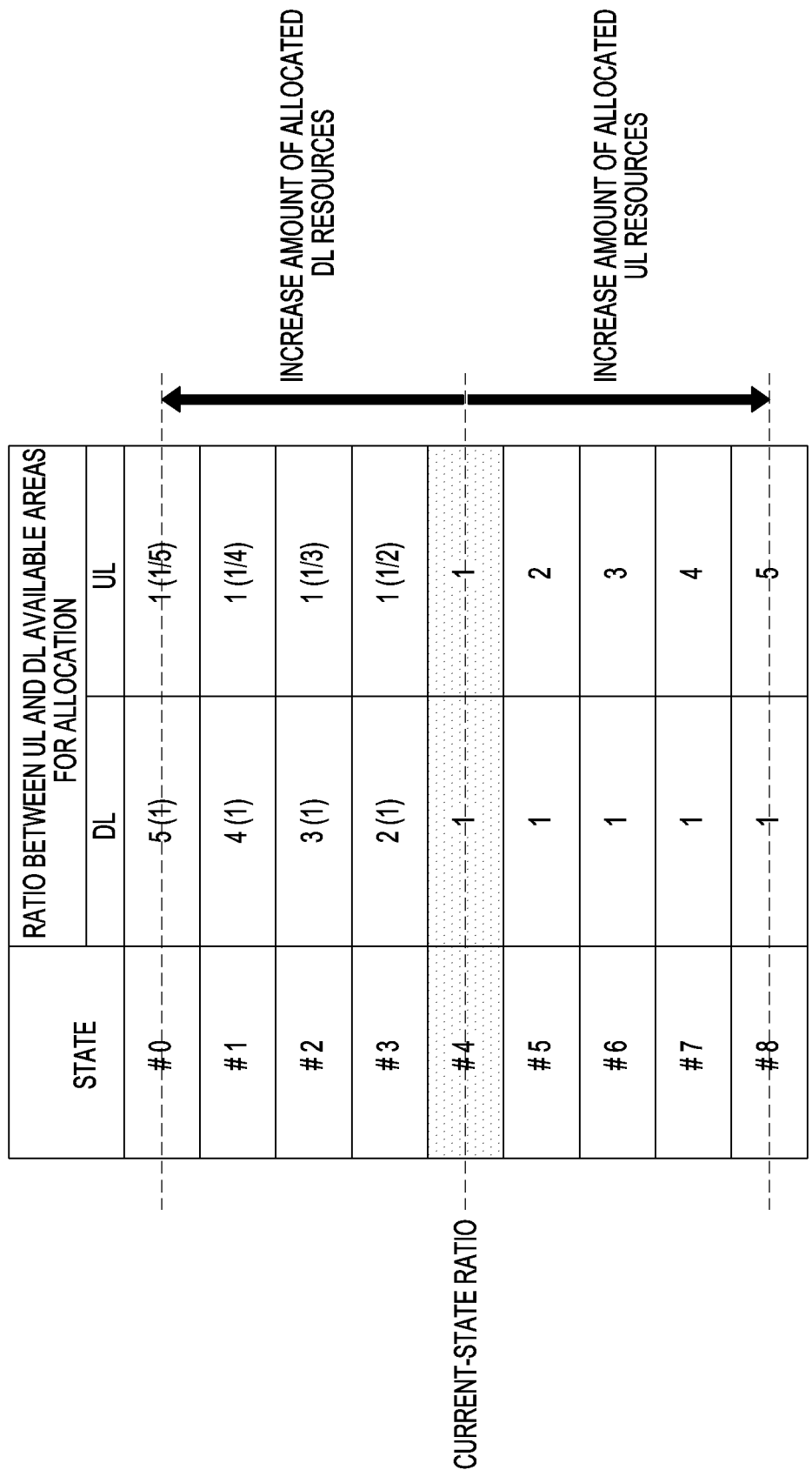
FIG. 7 is a diagram illustrating an example of changing a ratio between a UL resource area and a DL resource area according to an embodiment.

FIG. 7 is a diagram illustrating an example of changing the ratio between a UL resource area and a DL resource area according to an embodiment.

In operation 450 of FIG. 4, the BS may change the ratio identified in operation 410, referring to the table of FIG. 7.

For example, when the index of a current state is #4, the ratio of a DL-dedicated region to a UL-dedicated region in the current TTI may be identified as 1:1.

Subsequently, when the DL resource use rate is equal to or larger than the first threshold and the UL resource use rate is less than the first threshold (in operation 533 of FIG. 5a), the BS may decrease the state index to state index #3 lower than the current state #4. In this case, the ratio of the DL-dedicated region to the UL-dedicated region is increased by a predetermined ratio (twice).

FIGS. 8a and 8b are diagrams illustrating a method of determining the ratio of a DL available area for allocation to a UL available area for allocation in consideration of electric field information according to an embodiment.

When it is identified that a UL resource use rate and a DL resource use rate are equal to or larger than a predetermined level, both of a UL BO and a DL BO are higher values close to each other. Herein, the BS may change the ratio of the DL-dedicated region to the UL-dedicated region identified in operation 410 of FIG. 4 in consideration of electric field information (e.g., SINR) without calculating the resource use rates.

For example, the BS may primarily calculate the resource use rates of eMTC UEs. When identifying that UL resource use rates and DL resource use rates are all relatively high, the BS may secondarily determine the amounts of UL resources and the amounts of DL resources in consideration of electric field properties.

The BS may change the ratio identified in operation 410 of FIG. 4 by using electric field information (with low computation complexity) without performing complex computations (e.g., the first method or the second method in operation 430) to obtain a DL resource use rate and a UL resource use rate. Accordingly, the BS may not collect the BOs of the eMTC UEs any longer. Herein, the BS may assume that the eMTC UEs within the coverage of the BS have similar BOs.

A range in which the BS may transmit and receive information to and from an eMTC UE may be defined as coverage. A transmitting coverage may be determined based on the wireless transmission strength of the BS, and a receiving coverage may be determined based on the reception sensitivity of an eMTC UE signal at the BS. That is, the BS may identify the electric field property of each eMTC UE based on reception sensitivity information (or "electric field information"), and calculate the number of eMTC UEs (e.g., $I_1, I_2, I_3, \ldots$) belonging to at least one group (e.g., 1, 2, 3, . . . ) classified based on reception sensitivity information.

Further, the BS may calculate the ratio of DL-dedicated regions to UL-dedicated regions for total UEs based on preferred ratios of a DL-dedicated region to a UL-dedicated region, set for the respective groups. A preferred ratio of a DL-dedicated region to a UL-dedicated region may be predetermined based on the number of eMTC UEs located within coverage, and according to some embodiments, may be pre-stored by an operator of the BS. For example, when the number of UEs of a group to which an eMTC UE exceeding a first quality threshold belongs is $I_1$, the preferred ratio of a DL-dedicated region to a UL-dedicated region may be preset to $m_1:n_1$.

According to some embodiments, reception sensitivity information may include, but not limited to, an SINR or a channel quality indicator (CQI). The reception sensitivity information may include all of information indicating a reception quality reported by an eMTC UE.

According to some embodiments, the BS may calculate a readjustment ratio, using the tables of FIGS. 8a and 8b.

For example, the BS may define three groups 810, 820 and 830 based on a first quality threshold and a second quality threshold (less than the first quality threshold). Each of the groups 810, 820 and 830 may have a preferred ratio of a DL-dedicated region to a UL-dedicated region, corresponding to the group. The preferred ratio for each group may be information preconfigured by the BS.

Once the number of eMTC UEs is calculated according to FIG. 8a, the BS may calculate a weighted preferred ratio X. For example, the BS may define three groups 840, 850 and 860 based on a first preference threshold and a second preference threshold (less than the first preference threshold). The BS may identify a group to which X belongs among the groups 840, 850, and 860. For example, when X belongs to the group 850, the BS may change the ratio of the DL-dedicated region to the UL-dedicated region, identified in operation 410 of FIG. 4 to $m_2:n_2$.

The BS may determine a UL or DL-dedicated region according to the distribution of eMTC UEs classified according to electric field properties to provide fairness between UL resource allocation and DL resource allocation, or fairness in a multi-eMTC UE access environment. As the fairness is provided, the present disclosure may provide equal network resources to a plurality of eMTC UEs conducting UL communication or DL communication with the BS.

Figure 9A:
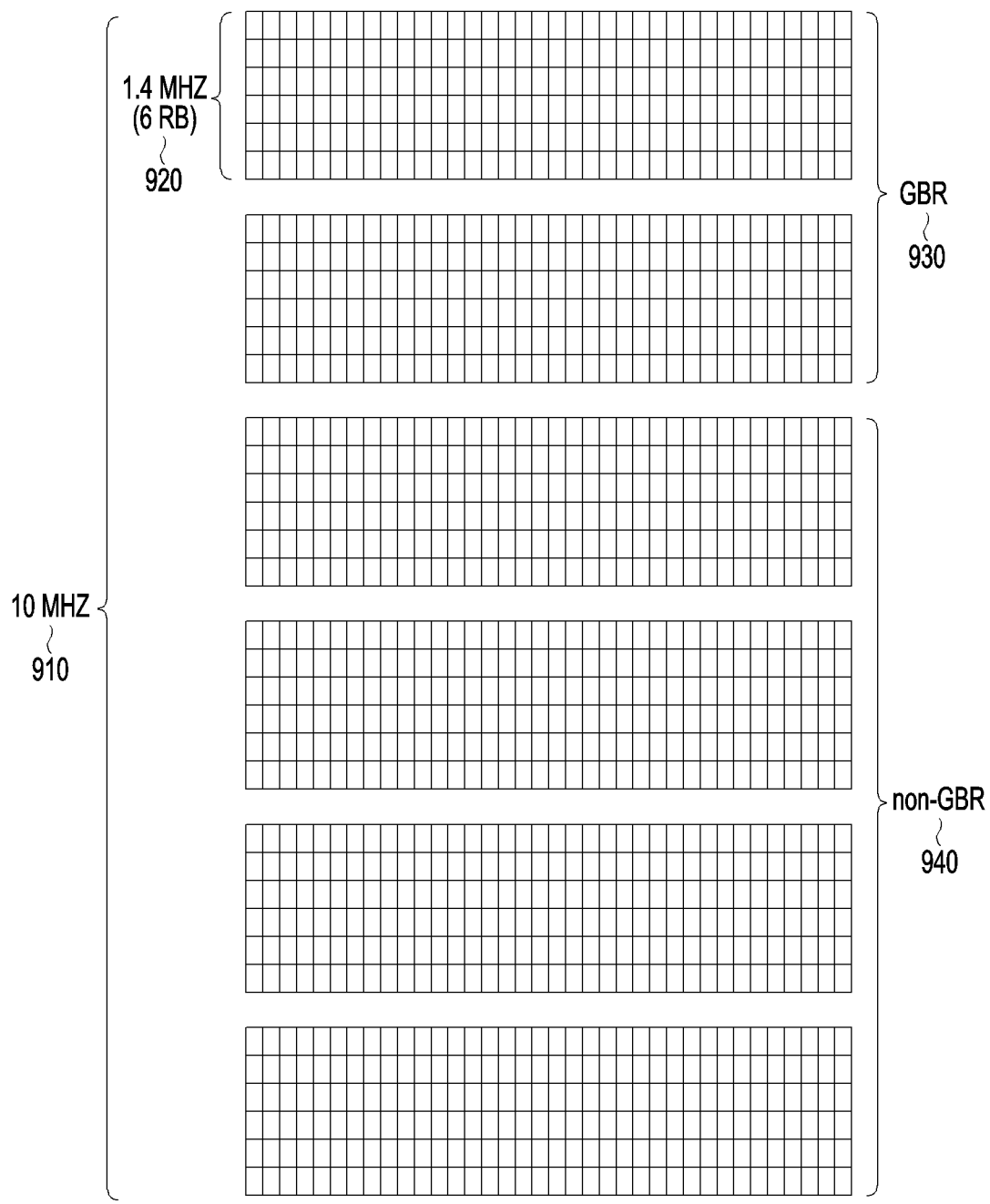
FIG. 9a is a diagram illustrating allocated physical channel resources which are classified by resource type according to an embodiment.
Figure 9B:
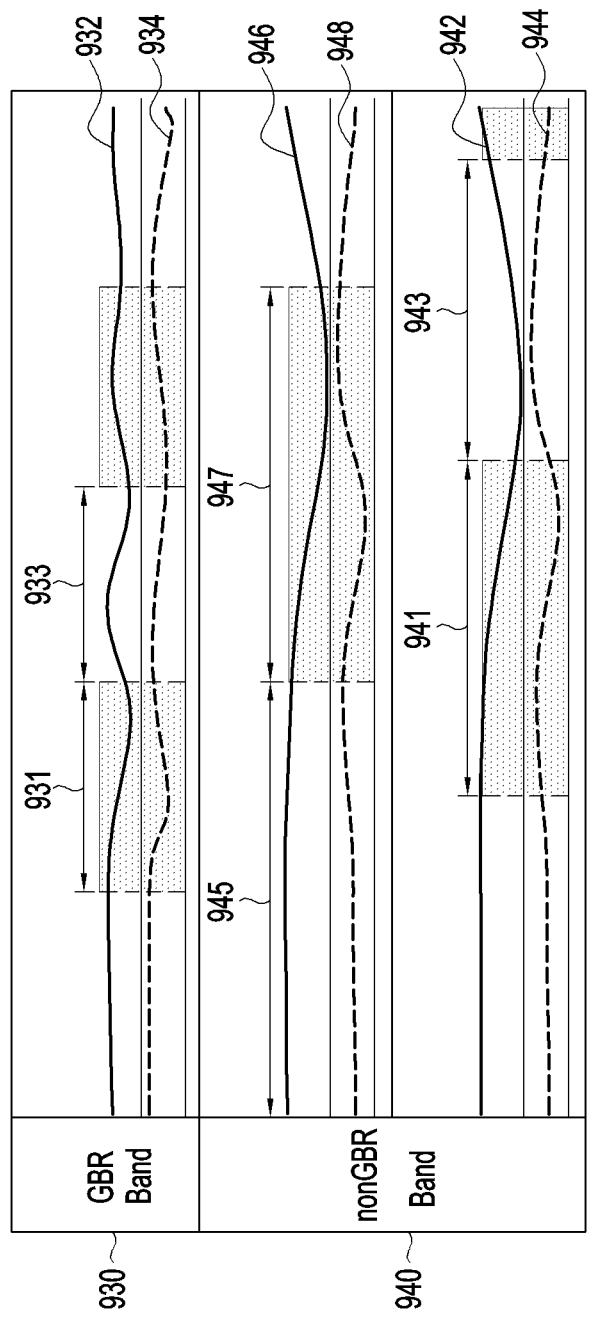
FIG. 9b is a diagram illustrating a UL resource area and a DL resource area which are configured dynamically according to an embodiment.

FIG. 9a is a diagram illustrating allocated physical resources classified by resource type according to an embodiment, and FIG. 9b is a diagram illustrating a UL resource area and a DL resource area which are distinguished from each other dynamically according to an embodiment. In FIGS. 9a and 9b, different frequency areas are allocated for different resource types.

For the eMTC UE, the BS may allocate DL data or UL data to a partial frequency area 910 of the frequency area for LTE communication. The partial frequency area 910 may be divided into a plurality of narrowband areas 920. For example, the size of the partial frequency area 910 may be 10 MHz, and the size of each narrowband area 920 may be 1.4 MHz. Thus, DL data or UL data may be allocated to the eMTC UE in six narrowband areas.

The BS may allocate a different resource area according to the QoS of DL data or UL data. The BS may distinguish data with a resource type being GBR from data with a resource type being non-GBR by parameters included in QoS. The BS may allocate the GBR data to a first frequency area 930, and the non-GBR data to a second frequency area 940. The QoS priority of the GBR data may be higher than the QoS priority of the non-GBR data.

According to some embodiments, the GBR data is data of a type for which a bandwidth may be guaranteed. To ensure the reception quality of traffic, a length of the dedicated region of the GBR data may be smaller than a length of the dedicated region of the second frequency area to which the non-GBR data is allocated. For example, data for a voice call service is sensitive to delay, and data for the VoLTE service may be a representative example of GBR data.

For GBR data, a relatively short maximum available time for preventing a data transmission delay is more appropriate than repeated transmissions for ensuring coverage extension. In contrast, a relatively long maximum available time is appropriate for non-GBR data to perform repeated transmissions for ensuring coverage extension. When co-located GBR data and non-GBR data are allocated to resources, data transmission delay may occur to the GBR data and data coverage extension may not be guaranteed for the non-GBR data.

Therefore, in an embodiment, the BS may allocate different frequency areas 930 and 940 to the GBR data and the non-GBR data, and the time durations of dedicated regions may be determined differently according to the frequency areas.

For example, the BS may set the length T_VoLTE of a dedicated region in a frequency area to which VoLTE data as GBR data is allocated to the generation periodicity (for example, 20 ms or 40 ms) of a data packet for the VoLTE service. Further the BS may set the length T_nonVoLTE of a dedicated region in a frequency area to which non-VoLTE data as non-GBR data is allocated to the product between a resource allocation unit time (for example, 1 ms) and a repetition number. According to some embodiments, a different repetition number may be set for each eMTC UE, and for each BS.

Referring to FIG. 9b, the BS may consider different elements for resource allocation in the time domain and the frequency domain. In FIG. 9b, a traffic buffer over time is shown. Specifically, FIG. 9b illustrates a DL traffic BO 932 for a GBR UE, a UL traffic BO 934 for the GBR UE, a DL traffic BO 942 in the case where more eMTC UEs than a predetermined number have high reception sensitivities among non-GBR UEs, a UL traffic BO 944 in the case where more eMTC UEs than the predetermined number have high reception sensitivities among the non-GBR UEs, a DL traffic BO 946 in the case where more eMTC UEs than a predetermined number have low reception sensitivities among the non-GBR UEs, and a UL traffic BO 948 in the case where more eMTC UEs than the predetermined number have low reception sensitivities among the non-GBR UEs.

As a frequency-domain feature, the BS may configure transmission of data for a GBR UE and data for a non-GBR UE in the different frequency areas 930 and 940 to consider the QoS of eMTC UEs.

In additional consideration of a time-domain feature, the BS may determine the ratio of a DL-dedicated region to a UL-dedicated region. According to some embodiments, the ratio of a DL-dedicated region to a UL-dedicated region may be determined to be the ratio of the time duration of the DL-dedicated region to the time duration of the UL-dedicated region.

A first ratio of a UL-dedicated region 933 to a DL-dedicated region 931 in the GBR band 930, a second ratio of a UL-dedicated region 943 to a DL-dedicated region 941 in the non-GBR band 940, and a third ratio of a DL-dedicated region 947 to a UL-dedicated region 945 may all be different.

According to some embodiments, the time durations 941 and 947 of DL available resource areas for allocation in the non-GBR band 940 may be longer than the time duration 931 of a DL available resource area for allocation in the GBR band 930.

To guarantee the data reception quality of the GBR band 930, the transmission periodicity of DL data and the reception periodicity of UL data are preferably short, and the BS may set the time duration 931 of the DL-dedicated region in the GBR band 930 to be relatively short. That is, the BS may alternate DL scheduling and UL scheduling with a short periodicity to prevent the delay of data transmission and reception.

Compared to the GBR band 930 sensitive to the delay of data transmitted and received in real time, the time durations 941 and 947 of the DL-dedicated regions in the non-GBR band 940 may be set to be relatively long to guarantee the repeated transmissions of the data in consideration of an extension of coverage in which the data transmission is available. This operation may apply to the time duration of a dedicated region for UL data in a similar manner.

According to some embodiments, in the non-GBR band 940, the maximum length 945 of a DL-dedicated region and the maximum length 947 of a UL-dedicated region in an environment in which there are many UEs having low SINRs may be set to be longer than the maximum length 943 of a DL-dedicated region and the maximum length 941 of a UL-dedicated region in an environment in which there are many UEs having relatively high SINRs.

The BS may classify eMTC UEs within its coverage based on their reception sensitivities. According to some embodiments, the BS may classify reception sensitivities based on SINRs or CQIs, which should not be construed as limiting the present disclosure. As far as it indicates a reception quality reported by an eMTC UE, any information may be used to classify reception sensitivities. According to some embodiments, the BS may define groups 810, 820, and 830 corresponding to three areas based on a first quality threshold (high SINR) and a second quality threshold (low SINR). The BS may determine eMTC UEs classified as the group 830 to have low reception sensitivities.

For example, when many of eMTC UEs transmitting and receiving data have low reception sensitivities, the BS may increase the maximum length 945 of the DL-dedicated region and the maximum length 947 of the UL-dedicated region to increase repeated transmissions of data and thus extend coverage. That is, the BS may guarantee coverage extension by increasing the maximum length of a dedicated region in frequency resources in which a large number of eMTC UEs have low reception sensitivities.

For example, when there are many UEs having high reception sensitivities among eMTC UEs transmitting and receiving data, the BS may decrease the maximum length 945 of the DL-dedicated region and the maximum length 947 of the UL-dedicated region.

Figure 10:
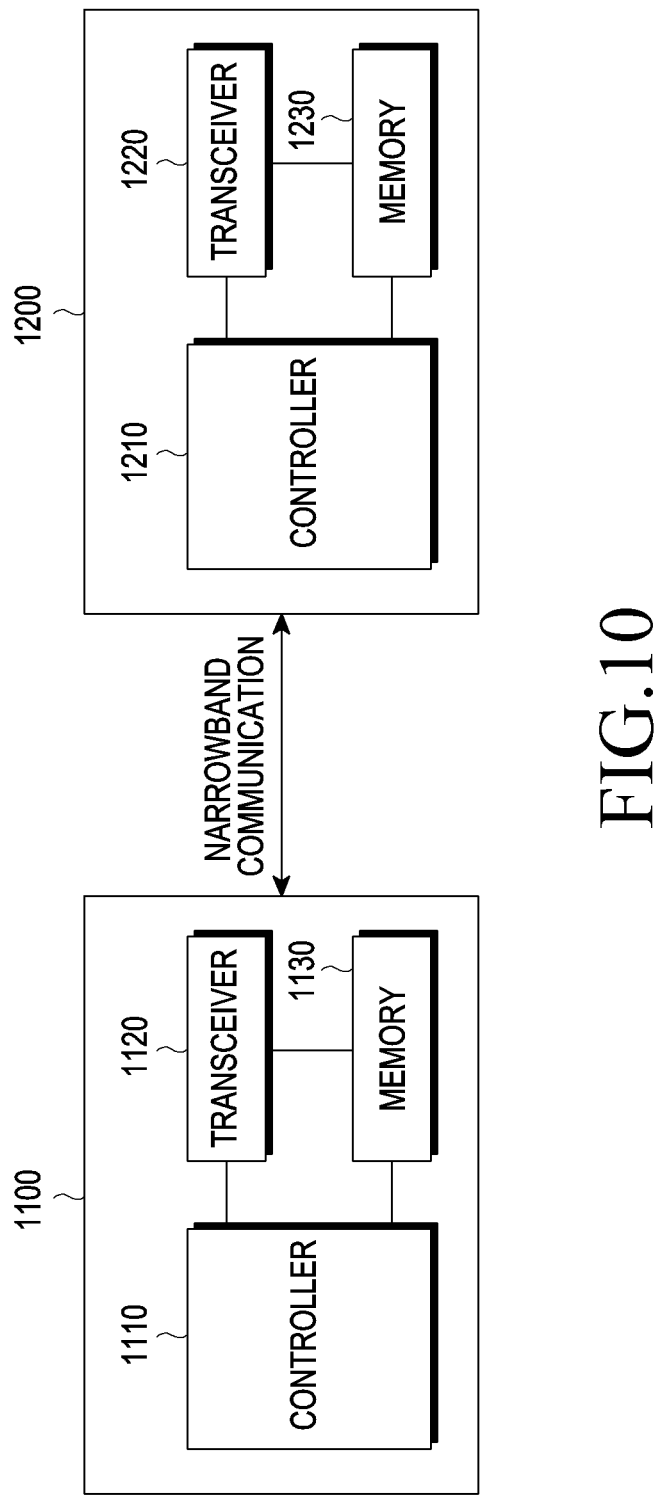
FIG. 10 is a block diagram illustrating the configurations of a BS and a UE according to an embodiment.

FIG. 10 is a block diagram illustrating the configurations of a BS and an eMTC UE according to an embodiment.

Referring to FIG. 10, a BS 1100 may include a transceiver 1120 transmitting and receiving data to and from an eMTC UE 1200 or an LTE UE, a controller 1110 providing overall control to the BS 1100, and a memory 1130 including data to be transmitted to the eMTC UE 1200.

It may be understood that all techniques or methods described as performed by the BS are performed under the control of the controller 1110 in the present disclosure. However, it is apparent that the controller 1110 and the transceiver 1120 may be incorporated into one component such as a single chip, not necessarily configured as separate devices.

The eMTC UE 1200 may include a transceiver 1220 transmitting and receiving data to and from the BS 1100, a controller 1210 providing overall control to the eMTC UE 1200, and a memory 1230 including data to be transmitted to the BS 1100.

It may be understood that all techniques or methods described as performed by the UE are performed under the control of the controller 1210 in the present disclosure. However, it is apparent that the controller 1210 and the transceiver 1220 may be incorporated into one component such as a single chip, not necessarily configured as separate devices.

It should be noted that the methods, system configurations, and device configurations illustrated in FIGS. 1 to 10 are not intended to limit the scope of the present disclosure. That is, all configurations or operations illustrated in FIGS. 1 to 10 should not be interpreted as essential components for implementation of the present disclosure, and may be implemented within the scope that does not impair the subject matter of the present disclosure even though only some of the components are included.

The above-described operations may be realized by providing a memory device storing a corresponding program code in any component of a BS or a UE in a communication system. That is, the controller of the BS or the UE may perform the above-described operations by reading and executing the program code stored in the memory by a processor or a central processing unit (CPU).

Various components, modules, and so on of the BS or the UE described in this specification may operate by a hardware circuit such as a complementary metal oxide semiconductor-based logic circuit, firmware, software and/or a combination of hardware, firmware, and/or software embedded in a machine-readable medium. For example, various electrical structures and methods may be implemented using transistors, logic gates, and electrical circuits such as application specific integrated circuits (ASICs).

While specific embodiments of the present disclosure have been described above, many modifications can be made without departing from the scope of the present disclosure. Therefore, the scope of the present disclosure should be determined by the appended claims and their legal equivalents, not by the above description.

The invention claimed is:

1. A method of allocating transmission resources including an uplink (UL)-dedicated region and a downlink (DL)-dedicated region by a base station, the method comprising:
identifying a ratio of the DL-dedicated region to the UL-dedicated region;
changing the ratio of the DL-dedicated region to the UL-dedicated region based on a usage rate of the transmission resources, wherein the transmission resources include first transmission resources and second transmission resources distinguished from each other on a frequency axis, the first transmission resources supporting transmission of more delay-sensitive data than the second transmission resources; and
allocating the UL-dedicated region and the DL-dedicated region according to the changed ratio of the DL-dedicated region to the UL-dedicated region,
wherein the first transmission resources include a first UL-dedicated region and the second transmission resources includes a second UL-dedicated region,
wherein a maximum length on a time axis of the first UL-dedicated region is different from a maximum length on the time axis of the second UL-dedicated region, and
wherein the maximum length of the first UL-dedicated region or the second UL-dedicated region is determined based on a maximum number of UL repeated transmissions.

2. The method of claim 1, wherein the usage rate of the transmission resources includes an UL resource usage rate being a ratio of an amount of required UL resources to an amount of UL available resources for allocation in the transmission resources, and a DL resource usage rate being a ratio of an amount of required DL resources to an amount of DL available resources for allocation in the transmission resources.

3. The method of claim 2, wherein the changing of the ratio of the DL-dedicated region to the UL-dedicated region comprises:
when the UL resource usage rate is less than a first threshold, and the DL resource usage rate is equal to or larger than the first threshold, increasing the ratio of the DL-dedicated region to the UL-dedicated region.

4. The method of claim 2, wherein the changing of the ratio of the DL-dedicated region to the UL-dedicated region comprises:
when the UL resource usage rate is equal to or larger than a first threshold, and the DL resource usage rate is less than the first threshold, decreasing the ratio of the DL-dedicated region to the UL-dedicated region.

5. The method of claim 2, wherein the changing of the ratio of the DL-dedicated region to the UL-dedicated region comprises:

when the UL resource usage rate and the DL resource usage rate are equal to or larger than a first threshold, and the DL resource usage rate is equal to or larger than a sum of the UL resource usage rate and an offset, increasing the ratio of the DL-dedicated region to the UL-dedicated region.

6. The method of claim 2, wherein the changing of the ratio of the DL-dedicated region to the UL-dedicated region comprises:
when the UL resource usage rate and the DL resource usage rate are equal to or larger than a first threshold, and the UL resource usage rate is equal to or larger than a sum of the DL resource usage rate and an offset, decreasing the ratio of the DL-dedicated region to the UL-dedicated region.

7. The method of claim 1, wherein a maximum length of the first UL-dedicated region of the first transmission resources is smaller than a maximum length of the second UL-dedicated region of the second transmission resources, and
wherein a maximum length of a first DL-dedicated region of the first transmission resources is smaller than a maximum length of a second DL-dedicated region of the second transmission resources.

8. The method of claim 1, wherein the first transmission resources support transmission of guaranteed bit rate (GBR)-type data, and
wherein the second transmission resources support transmission of non-GBR-type data.

9. The method of claim 1, further comprising changing the ratio of the DL-dedicated region to the UL-dedicated region based on a number of user equipments (UEs) and a preferred ratio of a DL-dedicated region to a UL-dedicated region, for each of UE groups classified according to electric field property information.

10. A base station for allocating transmission resources including an uplink (UL)-dedicated region and a downlink (DL)-dedicated region, the base station comprising:
a transceiver; and
a controller, the controller is configured to:
identify a ratio of the DL-dedicated region to the UL-dedicated region,
change the ratio of the DL-dedicated region to the UL-dedicated region based on a usage rate of the transmission resources, and
allocate the UL-dedicated region and the DL-dedicated region according to the changed ratio of the DL-dedicated region to the UL-dedicated region, wherein the transmission resources include first transmission resources and second transmission resources distinguished from each other on a frequency axis, the first transmission resources supporting transmission of more delay-sensitive data than the second transmission resources,
wherein the first transmission resources include a first UL-dedicated region and the second transmission resources includes a second UL-dedicated region, and
wherein a maximum length on a time axis of the first UL-dedicated region is different from a maximum length on the time axis of the second UL-dedicated region, and
wherein the maximum length of the first UL-dedicated region or the second UL-dedicated region is determined based on a maximum number of UL repeated transmissions.

11. The base station of claim 10, wherein the usage rate of the transmission resources includes an UL resource usage rate being a ratio of an amount of required UL resources to an amount of UL available resources for allocation in the transmission resources, and a DL resource usage rate being a ratio of an amount of required DL resources to an amount of DL available resources for allocation in the transmission resources.

12. The base station of claim 11, wherein the controller is configured to increase the ratio of the DL-dedicated region to the UL-dedicated region when the UL resource usage rate is less than a first threshold, and the DL resource usage rate is equal to or larger than the first threshold.

13. The base station of claim 11, wherein the controller is configured to decrease the ratio of the DL-dedicated region to the UL-dedicated region when the UL resource usage rate is equal to or larger than a first threshold, and the DL resource usage rate is less than the first threshold.

14. The base station of claim 11, wherein the controller is configured to increase the ratio of the DL-dedicated region to the UL-dedicated region when the UL resource usage rate and the DL resource usage rate are equal to or larger than a first threshold, and the DL resource usage rate is equal to or larger than a sum of the UL resource usage rate and an offset.

15. The base station of claim 11, wherein the controller is configured to decrease the ratio of the DL-dedicated region to the UL-dedicated region when the UL resource usage rate and the DL resource usage rate are equal to or larger than a first threshold, and the UL resource usage rate is equal to or larger than a sum of the DL resource usage rate and an offset.

16. The base station of claim 10,
a maximum length of the first UL-dedicated region of the first transmission resources is smaller than a maximum length of the second UL-dedicated region of the second transmission resources; and
a maximum length of a first DL-dedicated region of the first transmission resources is smaller than a maximum length of a second DL-dedicated region of the second transmission resources.

17. The base station of claim 10, wherein the first transmission resources support transmission of guaranteed bit rate (GBR)-type data; and
the second transmission resources support transmission of non-GBR-type data.

18. The base station of claim 10, wherein the controller is configured to change the ratio of the DL-dedicated region to the UL-dedicated region based on a number of user equipments (UEs) and a preferred ratio of a DL-dedicated region to a UL-dedicated region, for each of UE groups classified according to electric field property information.

* * * * *